(12) United States Patent
Nelson et al.

(10) Patent No.: US 11,028,899 B1
(45) Date of Patent: Jun. 8, 2021

(54) DRY DAMPER IN DRIVE SERIES WITH DUAL MASS FLYWHEEL FOR HYBRID DRIVE

(71) Applicant: Schaeffler Technologies AG & Co. KG, Herzogenaurach (DE)

(72) Inventors: Kyle Nelson, Dover, OH (US); Jonathan Adams, Stow, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/738,346

(22) Filed: Jan. 9, 2020

(51) Int. Cl.
*F16F 15/315* (2006.01)
*H02K 7/02* (2006.01)
*F16H 45/02* (2006.01)

(52) U.S. Cl.
CPC ......... *F16F 15/3153* (2013.01); *F16H 45/02* (2013.01); *H02K 7/02* (2013.01)

(58) Field of Classification Search
CPC .............................. F16F 15/3153; H02K 7/02
See application file for complete search history.

(56) References Cited

U.S. PATENT DOCUMENTS

| 8,287,390 | B2* | 10/2012 | Reinhart | F16F 15/123 464/180 |
| 2008/0108469 | A1* | 5/2008 | Weinschenker | F16H 57/0434 475/72 |
| 2012/0178568 | A1* | 7/2012 | Schoenek | F16H 57/0484 475/5 |
| 2013/0125700 | A1* | 5/2013 | Saeki | F16F 15/1395 74/572.2 |
| 2014/0124321 | A1* | 5/2014 | Frait | B60K 6/405 192/66.3 |
| 2015/0354671 | A1* | 12/2015 | Schoenek | H02K 7/006 475/5 |

\* cited by examiner

*Primary Examiner* — Vicky A Johnson
(74) *Attorney, Agent, or Firm* — Volpe Koenig

(57) ABSTRACT

A hybrid drive system includes a dual mass flywheel having an input side adapted for connection to a crankshaft of an internal combustion engine and an output. A dry damper assembly having an input flange is connected to an output of the dual mass flywheel and an output flange. An electric motor having a fixed mounted stator and a rotor is provided, and the output flange is connected to the rotor. A torque converter having a torque converter input is connected to the rotor and a torque converter output flange is adapted for connection to a downstream drive input shaft.

14 Claims, 4 Drawing Sheets

US 11,028,899 B1

DRY DAMPER IN DRIVE SERIES WITH DUAL MASS FLYWHEEL FOR HYBRID DRIVE

FIELD OF INVENTION

The present disclosure relates to a P1 hybrid application within a P2 hybrid product line.

BACKGROUND

Automotive OEMs and Tier 1 suppliers to OEMs have been considering different major powertrain architectures for MHEVs (Mild Hybrid Electric Vehicles). In these architectures, the electric motor can be positioned relative to the other powertrain components at five major points, referred to as P0 to P4. As shown in FIG. 5, P0 is located at the front end of the ICE (internal combustion engine), and is typically a front end accessory drive that provides power to the crankshaft via a belt. P1 provides for a direct connection to the crankshaft of the electric motor. P0 and P1 architectures do not allow mechanical disconnection of the electric motors from the ICE. P2 architecture provides a side attached electric motor between the ICE and the transmission that is dis-connectable from the ICE. P3 architecture provides for an electric motor that is connected to the transmission via intermeshing gears. Finally, P4 architecture provides for an electric motor that is connected to the drive axle via intermeshing gears. The P2-P4 architectures all allow the electric motor to be disconnected from the ICE.

It would be desirable to provide various different MHEV architectures within the same platform as well as for different platforms without the need for extensive changes in drive train components in order to not only offer different levels and cost structures within a product line, but also to allow for universal parts that can be used in different product lines.

SUMMARY

The present disclosure provides a drop in P1 solution that utilizes components which already exist for the P2 application, such as the common dual mass flywheel (DMF). The P1 architecture is easily achieved from a P2 architecture without requiring large changes in the other drive line components, and provides for improved damping characteristics for the DMF, which is useable in either the P1 or P2 application, using a dry damper which can substituted in the position of the disconnect clutch which is not present in the P1 application to disconnect the engine at will.

The present disclosure expands the damping isolation capabilities of the dual mass flywheel by providing the additional dry damper in series after the DMF. This can be used, for example, to provide additional spring volume that could be used for tuning the spring rate or adjusting the hysteresis for the system. For the P1 application, this additional dry damper takes the space which would otherwise be assigned to the disconnect clutch provided for the P2 module. Thus, the same family of vehicles could be offered with either a P1 or P2 system, or different vehicles could be produced with reduced costs and mostly common parts for a P1 or P2 hybrid drive.

In one aspect, the disclosure provides, a hybrid drive system having a dual mass flywheel with an input side adapted for connection to a crankshaft of an internal combustion engine and an output. A dry damper assembly is provided having an input flange connected to an output of the dual mass flywheel and an output flange. The dry damper is adapted to be located in the space occupied by the disconnect clutch in a P2 arrangement, allowing common components to be used between the two systems. An electric motor having a fixed mounted stator and a rotor is provided, and the output flange is connected to the rotor. A torque converter is provided downstream in the drive line and has a torque converter input connected to the rotor and a torque converter output flange adapted for connection to a downstream drive input shaft, for example of a transmission.

In one arrangement, the dual mass flywheel includes an outer ring on the input side and an inner ring as the output, and a plurality of springs are located between the inner ring and the outer ring. The inner ring may include an axially extending inner spline on an inner surface thereof, and the input flange of the dry damper may include an axially extending outer spline that axially engages with the inner spline.

The dry damper assembly may include a piloting hub radially supporting the dry damper assembly, with the input flange supported on the piloting hub.

The dry damper assembly may include a coil spring, or a plurality of coil springs that are circumferentially spaced apart, located between the input flange and the output flange. The dry damper assembly may also have cover plates that support the coil spring between the input flange and the output flange.

In another alternative, the dry damper assembly may have a centrifugal pendulum absorber located between the input flange and the output flange.

In one arrangement, a lock-up clutch is located between the rotor and the torque converter output flange.

In one arrangement, the output flange may include a plurality of projections and a rotor carrier of the rotor includes a plurality of complementary recesses, and the system further includes a snap ring that retains the output flange on the rotor carrier. These projections may be in the form of a spline, and the recesses are complementary to the spline. The projections of the output flange are axially received in the complementary recesses in the rotor. Other connections between the output flange and the rotor may be provided, such as rivets, bolts or other mechanical fasteners. The output flange is preferably pre-assembled with the rotor.

The connection between the input flange of the dry damper and the dual mass flywheel allow for axial positioning and sliding-in of the dry damper into the DMF in a modular manner in the space that would be occupied by the disconnect clutch for the electric motor of a corresponding P2 arrangement.

The dual mass flywheel, the dry damper assembly, the rotor, and the torque converter are arranged about a common axis.

A dry damper assembly is also provided as a modular component for use in a P1 hybrid drive system. The dry damper assembly includes an input flange adapted for connection to an output of a dual mass flywheel connected to an internal combustion engine. Axially extending projections are located on an outer surface of the input flange that are adapted to engage in recesses of the output of the dual mass flywheel. An output flange is rotatably supported on the input flange. A plurality of springs are located between the input flange and the output flange to damp a rotational movement between the input flange and the output flange. Axially extending projections are located on an outer surface of the output flange that are adapted to be received in complementary recesses in a rotor of a hybrid motor.

Covers may be formed on the input flange that support the plurality of springs.

A piloting hub may radially support the input flange, and the piloting hub has a projecting shaft stub that is adapted to be radially supported by the crankshaft and an axially opposite recess that is adapted to receive a stub shaft of a downstream drive component.

The input flange may include a plurality of spring recesses, and the output flange may include a plurality of radially inwardly extending fingers that project inwardly along outer sides of the spring recesses and contact ends of the springs.

By providing the dry damper, a dual mass flywheel from other applications, such as a P2 arrangement, can be carried over from such other applications, without needing to redesign a complex damper assembly in the DMF for each application. This makes the assembly more modular for other arrangements, and allows for optimization of the system damping by changing just one portion, i.e., the dry damper assembly.

Additional embodiments described below and in the claims.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
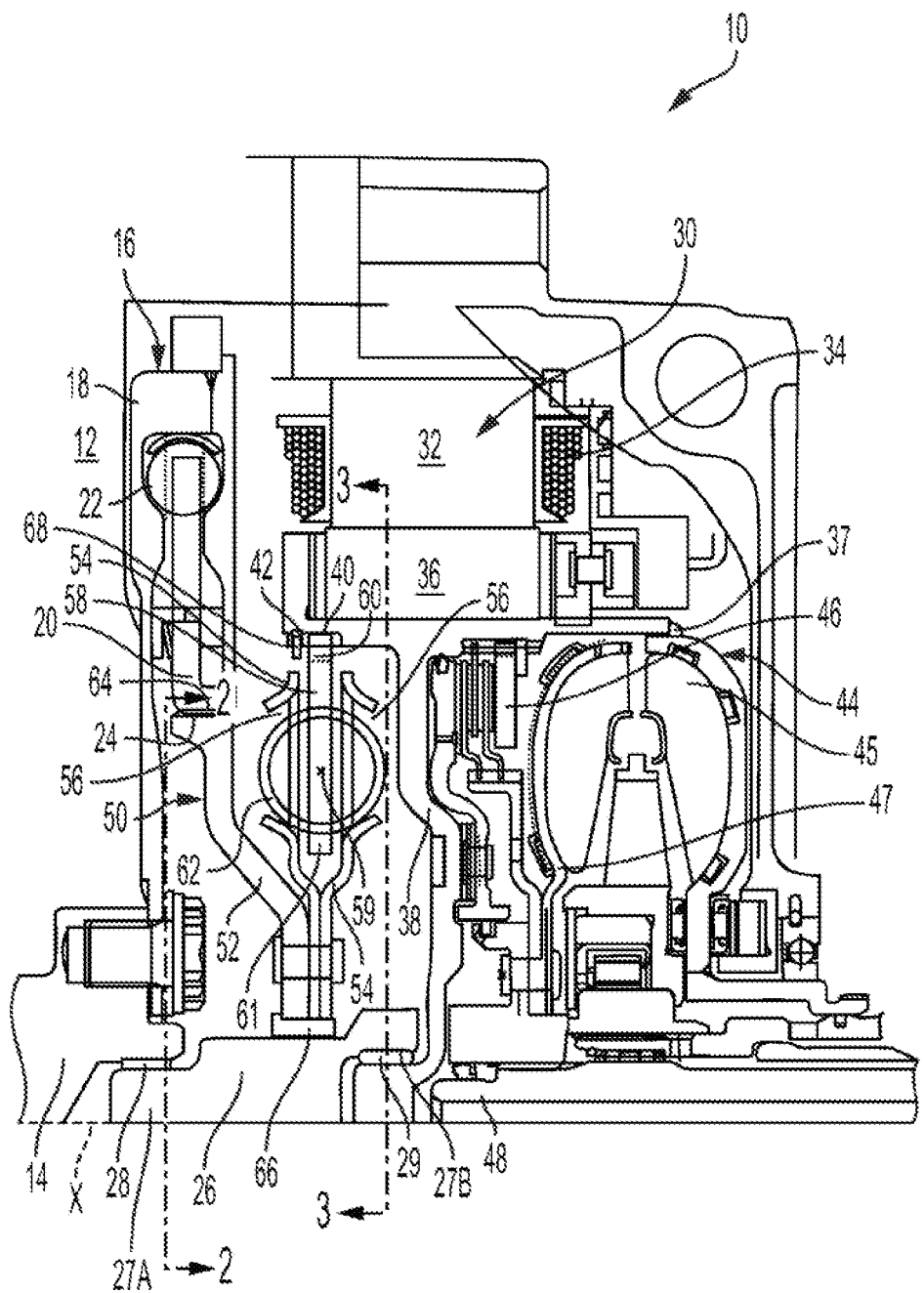
FIG. 1 is a half-cross-sectional view through an assembled drive train, including a dual mass flywheel connected to the crankshaft of an internal combustion engine, a dry damper connected in drive series with the dual mass flywheel, an electric motor of a hybrid drive, with the dry damper connected to the rotor, and a torque converter connected to the rotor, with an optional lock-up clutch being provided between the rotor and the torque converter.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

The term e-machine is used generally herein to refer to an electric motor, such as a motor including a rotor, stator with windings, resolver, etc., used here in connection with a hybrid drive system.

Figure 2:
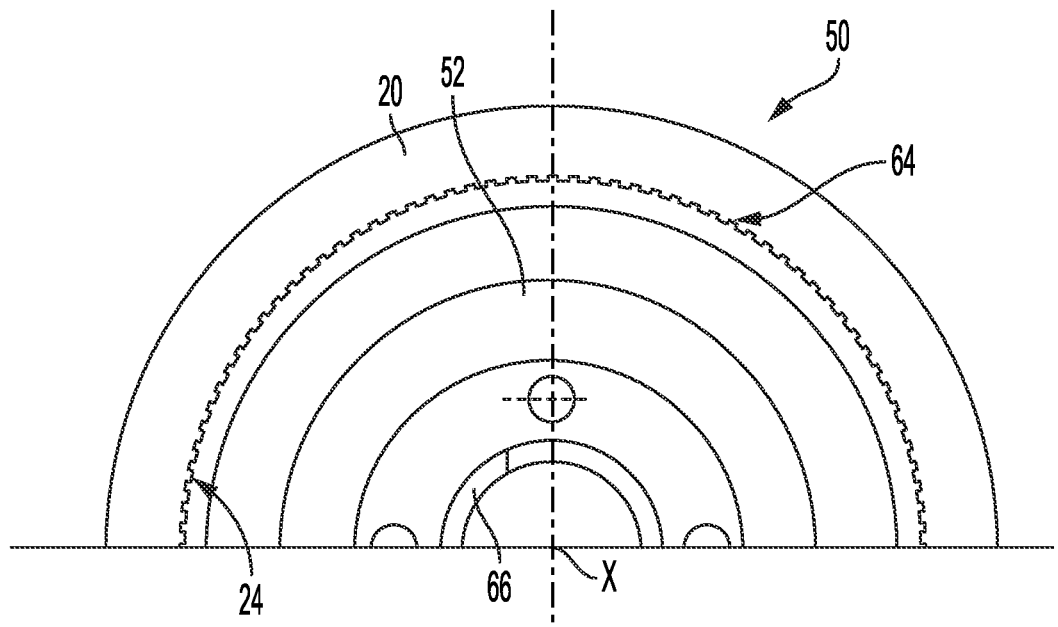
FIG. 2 is a front view taken along line 2-2 in FIG. 1 of the input flange of the dry damper.
Figure 3:
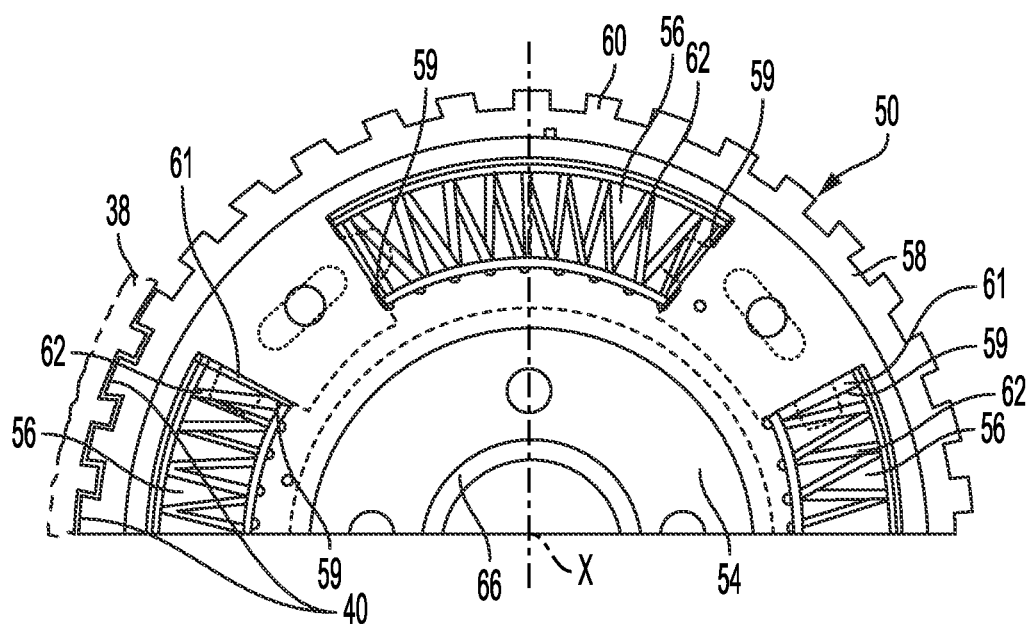
FIG. 3 is a rear view taken along line 3-3 in FIG. 1 of the cover and output flange of the dry damper.

Referring to FIGS. 1-3, hybrid drive system 10 in accordance with a first embodiment as shown. The hybrid drive system 10 is located between an internal combustion engine 12 which has a crankshaft 14 extending from a drive end thereof that is connected to a dual mass flywheel 16. The dual mass flywheel 16 is of the type generally known in the art and includes an input side in the form of an outer ring 18 that is adapted for connection to the crankshaft 14, as well as an output, in the form of an inner ring 20. As is known, damper springs 22 are located between the inner ring 18 and the outer ring 20. The inner ring 20 includes splines 24 which allows for an axial sliding connection to a downstream portion of the drive system.

As shown in detail in FIGS. 1-3, a dry damper assembly 50 is connected to the output of the dual mass flywheel 16. The dry damper assembly 50 includes an input flange 52, which includes mating splines 64 defined by projections that are adapted to be axially insertable and connected with the splines 24 that define complementary recesses on the inner ring 20 of the dual mass flywheel 16. The input flange 52 is connected to the dry damper output flange 58 via a damper system which includes dry damper cover plates 54 which have spring recesses 56 defined therein, as well as dry damper springs 62 that are located in and adapted to contact the circumferential ends of the spring recesses 56. The ends of the dry damper springs 62 also contact the circumferential end faces 59 of radially inwardly extending fingers 61 from the dry damper output flange 58 in order to provide additional damping.

Preferably the radially inner edge of the dry damper input flange 52 as well as the radially inner edges of the dry damper cover plates 54 are supported on a support bushing 66 which rests on a piloting hub 26 that is adapted to be supported in the end of the dual mass flywheel 16 as well as on the other end by a downstream part in the drive system. Bushings or bearings 28, 29 may be provided to support the piloting hub 26 to reduce friction.

Still with reference to FIG. 1, an e-machine/motor 30 is shown. The e-machine/motor 30 includes a stator 32 with windings 34 as well as a rotor 36 supported via a rotor carrier 38. In the illustrated embodiment, the piloting hub 26 is supported on a portion of the rotor carrier 38, which is supported at the end of the transmission input shaft 48.

The output flange 58 of the dry damper 50 includes a plurality of projections 60 and the rotor 36 or rotor carrier 38 include a plurality of complementary recesses 40. The dry damper assembly 50 is assembled and can preferably be pre-assembled to the rotor 36 and the rotor carrier 38 by engaging the plurality of projections 60 with the recesses 40 in order to provide a torque proof connection. A snap ring 68 that retains the output flange 58 on the rotor carrier 38 is inserted in a snap ring groove 42 formed in the rotor carrier 38.

The rotor 36 is preferably connected to a torque converter 44 which has a torque converter input 45 that is connected to the rotor 36 via the rotor carrier 38. This can be a connection between the rotor carrier 38 and the drive vanes located in the torque converter 44, as indicated by the connection at 37. The torque converter 44 includes an output flange 47 adapted for a connection to a downstream drive input shaft, such as the transmission input shaft 48. This is done in the known manner preferably via a splined connection between the transmission input shaft 48 and the driven side of the torque converter 44.

As shown in FIG. 1, optionally a lock-up clutch 46 is provided which is located between the rotor 36 (shown here as attached to the rotor carrier 38) and the driven side of the torque converter 44 that is connected to the transmission input shaft 48.

The use of the axially extending inner splines 24 on the dual mass flywheel 16 and the axially extending the outer splines 64 on the input flange 52 of the dry damper assembly 50 allows for assembly of the pre-assembled dry damper assembly 50 and rotor 36 of the e-machine/motor 30 with the dual mass flywheel 16.

The dry damper assembly 50 provides additional spring volume to adjust for example, a specific spring rate and or hysteresis desired for a particular application. This can be done by changing the size, number, and/or spring constant of the dry damper springs 62.

As shown in FIG. 1, the dual mass flywheel 16, the dry damper assembly 50, the rotor 36, and the torque converter 44 are all arranged about a common axis X. Using this system, it is possible for the dry mass damper 50 to be provided as a modular unit which can replace a P2 clutch element in order to allow these components to be used to form a P1 hybrid drive system with minimal change to other system components.

While the connection between the rotor carrier 38 and the output flange 58 of the dry damper is shown as including drive projections 60 and recesses 40, it would also be possible to provide other types of connections, such as rivets, bolts, or any other fixed connection.

Figure 4:
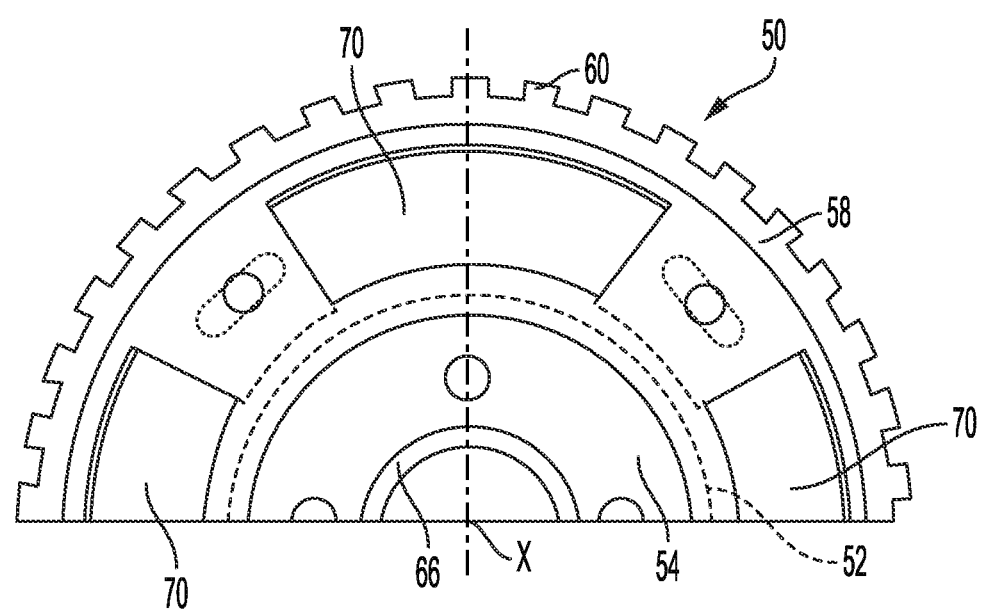
FIG. 4 is a rear view similar to FIG. 3 showing an alternate embodiment with a centrifugal pendulum absorber connected to the output flange of the dry damper.
Figure 5:
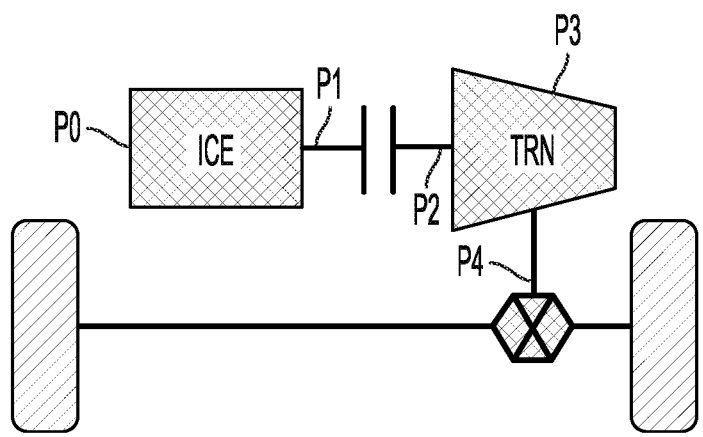
FIG. 5 is a prior art schematic view that describes various MHEV architectures.

Referring to FIG. 4, an alternate arrangement is partially illustrated in which the dry damper assembly 50 comprises a centrifugal pendulum absorber in place of the dry damper spring 62. This is schematically shown at 70 and is of the type generally known in the art and available from Schaeffler Technologies.

In another aspect, a dry damper assembly 50 for use in connection with a P1 hybrid drive system is provided. The dry damper assembly 50 is as described above and may optionally be provided with the support bushing 66 and/or the piloting hub 26 which supports the input flange 52. The piloting hub 26 has a projecting shaft stub 27A that is adapted to be radially supported by the crankshaft 14 and further includes an axially opposite recess 27B that is adapted to receive a stub shaft of a downstream drive component.

The dry damper assembly 50 can take the place that would be used by the clutch in a P2 hybrid drive system allowing other components to be used in a universal manner, such as the dual mass flywheel 16, as the dry damper 50 can be designed to take into account the required overall drive system requirements for damping including the specific spring rates and hysteresis required for various applications. This provides for cost savings through the reduction of different assemblies required for different applications while utilizing a space that would have otherwise been taken by the clutch in a P2 hybrid drive system.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

10 Hybrid drive system
12 Internal combustion engine
14 Crankshaft
16 Dual Mass Flywheel
18 Outer ring
20 Inner Ring
22 Springs
24 Spline on 20
26 Piloting hub
27A Projecting Shaft Stub
27B Recess adapted to Receive Downstream Drive Component
28 Crankshaft Bushing/Bearing
29 Converter Pilot Bushing/Bearing
30 e-machine/motor
32 Stator
34 Windings
36 Rotor
37 Rotor Connection to Torque Converter Input
38 Rotor Carrier
40 Drive recesses
42 Snap ring groove
44 Torque converter
45 Torque Converter Input
46 Lock-up Clutch
47 Torque Converter Output Flange
48 Transmission input shaft
50 Dry Damper Assembly
52 Dry Damper Input Flange
54 Dry Damper Cover Plates
56 Spring Recesses in Cover Plates
58 Dry Damper Output Flange
59 Output Flange Spring Contact surfaces
60 Output Flange Drive Projections
61 Radially Inwardly Extending Fingers
62 Dry Damper Springs
64 Spline on 52
66 Support bushing
68 Snap Ring
70 Centrifugal pendulum absorber

What is claimed is:

1. A hybrid drive system, comprising:
   a dual mass flywheel having an input side adapted for connection to a crankshaft of an internal combustion engine and an output;
   a dry damper assembly having an input flange connected to an output of the dual mass flywheel and an output flange rotatably supported on the input flange;
   an electric motor having a fixed mounted stator and a rotor, and the output flange is connected to the rotor;
   a torque converter having a torque converter input connected to the rotor and a torque converter output flange adapted for connection to a downstream drive input shaft; and
   wherein the dual mass flywheel, the dry damper assembly, the rotor, and the torque converter are arranged about a common axis.

2. The hybrid drive system of claim 1, wherein the dual mass flywheel includes an outer ring on the input side and an inner ring as the output, and a plurality of springs located between the inner ring and the outer ring.

3. The hybrid drive system of claim 2, wherein the inner ring includes an axially extending inner spline on an inner surface thereof, and the input flange includes an axially extending outer spline that axially engages with the inner spline.

4. The hybrid drive system of claim 1, wherein the dry damper assembly comprises a piloting hub radially supporting the dry damper assembly, and the input flange is supported on the piloting hub.

5. The hybrid drive system of claim 4, wherein the dry damper assembly comprises a coil spring located between the input flange and the output flange.

6. The hybrid drive system of claim 5, wherein the dry damper assembly comprises cover plates that support the coil spring between the input flange and the output flange.

7. The hybrid drive system of claim 4, wherein the dry damper assembly comprises a centrifugal pendulum absorber located between the input flange and the output flange.

8. The hybrid drive system of claim 1, further comprising a lock-up clutch located between the rotor and the torque converter output flange.

9. The hybrid drive system of claim 1, wherein the output flange includes a plurality of projections and the rotor is supported on a rotor carrier that includes a plurality of complementary recesses, and the system further comprises a snap ring that retains the output flange on the rotor carrier.

10. The hybrid drive system of claim 9, wherein the dry damper is pre-assembled with the rotor and the rotor carrier, with the projections of the output flange axially received in the complementary recesses in the rotor carrier.

11. A dry damper assembly for use in a P1 hybrid drive system, the dry damper assembly comprising:
    an input flange adapted for connection to an output of a dual mass flywheel connected to an internal combustion engine;
    an output flange rotatably supported on the input flange;
    a plurality of springs located between the input flange and the output flange to damp a rotational movement between the input flange and the output flange;
    axially extending projections on an outer surface of the output flange that are adapted to be received in complementary recesses in a rotor or a rotor carrier of a hybrid motor; and
    axially extending projections on an outer surface of the input flange that are adapted to engage in recesses of the output of the dual mass flywheel.

12. The dry damper assembly of claim 11, further comprising covers formed on the input flange that support the plurality of springs.

13. The dry damper assembly of claim 11, further comprising a piloting hub radially supporting the input flange, and the piloting hub has a projecting shaft stub that is adapted to be radially supported by a crankshaft and an axially opposite recess that is adapted to receive a stub shaft of a downstream drive component.

14. The dry damper assembly of claim 11, wherein the input flange includes a plurality of spring recesses, and the output flange includes a plurality of radially inwardly extending fingers that project inwardly along outer sides of the spring recesses and contact ends of the springs.

\* \* \* \* \*